(12) United States Patent
Banks et al.

(10) Patent No.: US 7,152,722 B1
(45) Date of Patent: Dec. 26, 2006

(54) TORQUE LIMITING SLEEVE AND METHOD OF USE

(76) Inventors: Daniel E. Banks, 5175 S. 36th St., Climax, MI (US) 49034; Michael R. Brown, II, 13200 E. Armour La., Battle Creek, MI (US) 49014

( * ) Notice: Subject to any disclaimer, the term of this patent is extended or adjusted under 35 U.S.C. 154(b) by 131 days.

(21) Appl. No.: 10/987,604

(22) Filed: Nov. 11, 2004

(51) Int. Cl.
*F16D 65/14* (2006.01)
*F16D 7/02* (2006.01)

(52) U.S. Cl. .................... 192/55.1; 188/71.8; 188/72.9
(58) Field of Classification Search ................ 192/55.1
See application file for complete search history.

(56) References Cited

U.S. PATENT DOCUMENTS

| | | | |
|---|---|---|---|
| 3,700,271 A * | 10/1972 | Blaurock et al. | 403/372 |
| 3,834,183 A * | 9/1974 | Muller | 464/51 |
| 4,222,246 A * | 9/1980 | Rongley | 464/30 |
| 4,351,419 A | 9/1982 | Garrett et al. | |
| 4,394,890 A | 7/1983 | Kleinhagen, Jr. | |
| 4,399,894 A * | 8/1983 | Tribe | 188/71.9 |
| 4,461,371 A * | 7/1984 | Feldmann et al. | 188/71.9 |
| 4,527,683 A | 7/1985 | Mathews | |
| 5,026,125 A * | 6/1991 | Matouka et al. | 303/162 |
| 5,788,022 A * | 8/1998 | Antony | 188/71.8 |
| 6,668,981 B1 * | 12/2003 | Ortegren et al. | 188/72.2 |

FOREIGN PATENT DOCUMENTS

DE 3142799 A1 * 5/1983

* cited by examiner

*Primary Examiner*—Richard M. Lorence
(74) *Attorney, Agent, or Firm*—Marshall & Melhorn, LLC

(57) ABSTRACT

A method and apparatus for selectively coupling members in a brake actuating mechanism. A coupling member is located between an outer clutch sleeve and a clutch cap. The coupling member exerts a pre-determined amount of force on both the outer clutch sleeve and the clutch cap. The force couples the outer clutch sleeve and the clutch cap. The coupling member allows the outer clutch sleeve and the clutch cap to decouple if a torque acting on the clutch cap exceeds the force exerted by the coupling member.

17 Claims, 2 Drawing Sheets

US 7,152,722 B1

TORQUE LIMITING SLEEVE AND METHOD OF USE

FIELD OF THE INVENTION

The present invention relates to a torque limiting sleeve for an air disc brake actuator clutch mechanism and a method of using the same.

BACKGROUND OF THE INVENTION

Torque limiting devices in brake actuator clutch mechanisms are well-known. The known devices can be divided into four basic categories. The first category includes devices utilizing a tightly wrapped coil spring to act as a torque limiting device. This design uses a precision machined, or formed, spring that acts on the internal diameter of a clutch sleeve. Devices in this category are disadvantageous since they typically require both a rotational movement and a linear movement to install and they are comparatively bulky in radial cross section.

The second category of devices are those that utilize a clutch pack assembly as the torque limiting device. This design uses a series of clutch plates, a splined inner and outer clutch sleeve, a compression spring to develop the clamping force on the clutch pack, and a variety of retaining and assembly parts. This design is disadvantageous since it typically requires a high number of components and it requires a large amount of space.

The third category of devices uses a ball spring torque limiting device. The ball spring torque limiting device is a highly machined and precisely designed structure with complex components, complex assembly and complex operation.

The last general category of devices uses a slip sleeve to wear surface torque limiting device. A compression spring produces a force that acts on a hardened sleeve that is in contact with a wear surface located on the rear of the tappet sleeve. The compression spring is retained by a custom-made quarter twist internal hex locking nut. The nut locks in a machined slot of hex cross section in the tappet sleeve. Devices in this category are known to have limited reliability.

Various embodiments of the devices in the above-described categories have been patented. For example, U.S. Pat. No. 4,351,419 teaches an adjustable mechanism having a first coil clutch and a second coil clutch. The clutches act together to permit adjustment of the mechanism to a predetermined torque, but slip if the predetermined torque is exceeded. More specifically, the clutches permit selective rotation of a nut member and an intermediate sleeve.

U.S. Pat. No. 4,394,890 teaches an adjustable clutch mechanism similar to the '419 patent in that two clutches are used. One of the clutches is a force limiting coil clutch that transmits clockwise torque from the intermediate sleeve to the driven sleeve. When the friction linings are not in contact with the disc, the torque transmitting capacity of the clutch is greater than that required to rotate the nut member. But, when the friction linings are in contact with the disc, the torque transmitting capacity is less than the torque required to rotate the nut member. The coil clutch thus acts as a torque limiting coupling for clearance sensing purposes in the low torque transmitting direction of rotation.

U.S. Pat. No. 4,527,683 provides for a torque limiting helical coil clutch drivingly connecting a first rotatable member and a second rotatable member. The coil clutch is right-hand wound to radially expand when transmitting a clockwise rotation and to radially contract when transmitting a counterclockwise rotation. The first member includes a bore in which one end of the coil clutch is received. The second member defines an outer periphery about which the other end of the coil clutch is received. In this orientation, the clutch will selectively slip or grip the first or second member based on the direction of rotation.

In light of the disadvantages of the prior art discussed above, it would be advantageous for a coupling device in a brake actuator mechanism to be cost effective, compact and simple to install. Additionally, the device should provide substantially constant torque resistance.

SUMMARY OF THE INVENTION

The present invention is directed toward a coupling device for a brake actuator mechanism. At least a portion of a clutch cap is coaxial with an outer clutch sleeve of the brake actuator mechanism. A coupling device is located between the clutch cap and the outer clutch sleeve for selectively coupling the clutch cap and the outer clutch sleeve.

The present invention is also directed toward a method of selectively coupling the clutch cap and the outer clutch sleeve with the coupling device. More specifically, the coupling device is disposed between an inner surface of the outer clutch sleeve and an outer surface of the clutch cap. The inner surface of the clutch cap is connected to a clutch drive shaft. The drive shaft is connected to a brake tappet and the outer clutch sleeve is connected to a brake lever. The clamping action of the brake generates a resistive torque between the brake tappet and a tappet sleeve that is passed through the mechanism to the coupling device. If the torque is greater than the designed torque capability of the coupling device, the outer clutch sleeve will rotate independently of the clutch drive shaft.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
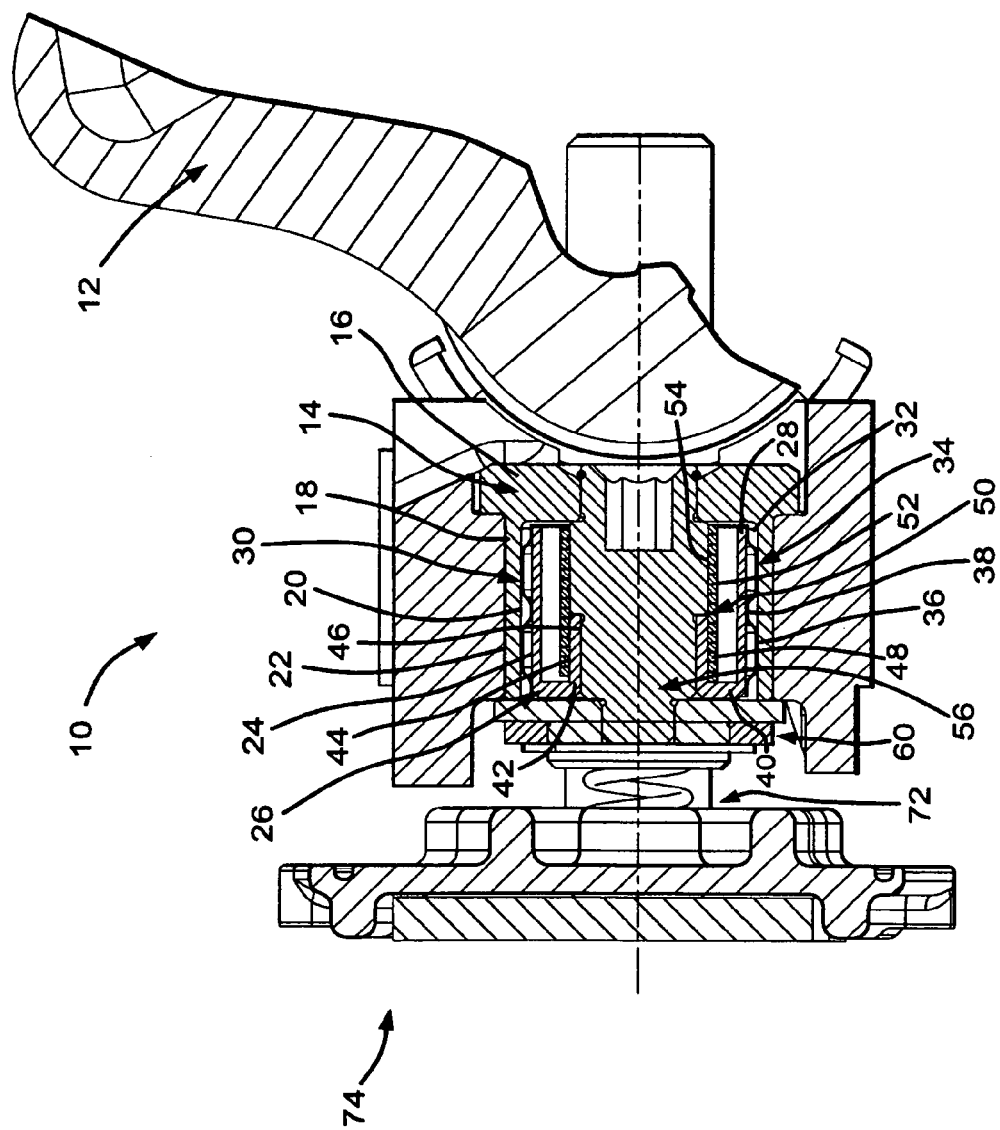
FIG. 1 is a cut-away side view of one embodiment of the present invention.

Referring now to FIG. 1, a preferred embodiment of a torque limiting device for a brake actuator mechanism 10 is depicted. The mechanism 10 comprises a lever 12 connected to a brake actuating device (not shown) in the operator's compartment of a vehicle (not shown), as known to those skilled in the art. The lever 12 is connected to an outer clutch sleeve 14 mounted for rotation in the mechanism 10. A connector portion 16 of the outer clutch sleeve 14 is preferably connected to the lever 12 with one or more pins (not shown).

The outer clutch sleeve 14 has a tubular portion 18 extending axially from the connector portion 16. The tubular portion 18 has an inside surface 20 and an outside surface 22. The inside surface 20 and the outside surface 22 are substantially parallel to one another.

Spaced a pre-determined distance apart from the inside surface 20 of the outer clutch sleeve 14 is an outer surface 24 of a clutch cap 26. The outer surface 24 of the clutch cap 26 is preferably located along a first leg 28 of the clutch cap 26. The outer surface 24 of the clutch cap 26 extends substantially parallel to the inside surface 20 of the outer clutch sleeve 14.

A coupling device 30 is preferably located in a gap 32 between the inside surface 20 of the outer clutch sleeve 14 and the outer surface 24 of the clutch cap 26. In a preferred embodiment, the coupling device 30 is a rolled sheet metal ring with at least one contour rolled into it. The contour is designed to contact the inside surface 20 of the outer clutch sleeve 14 and the outer surface 24 of the clutch cap 26.

Figure 2:
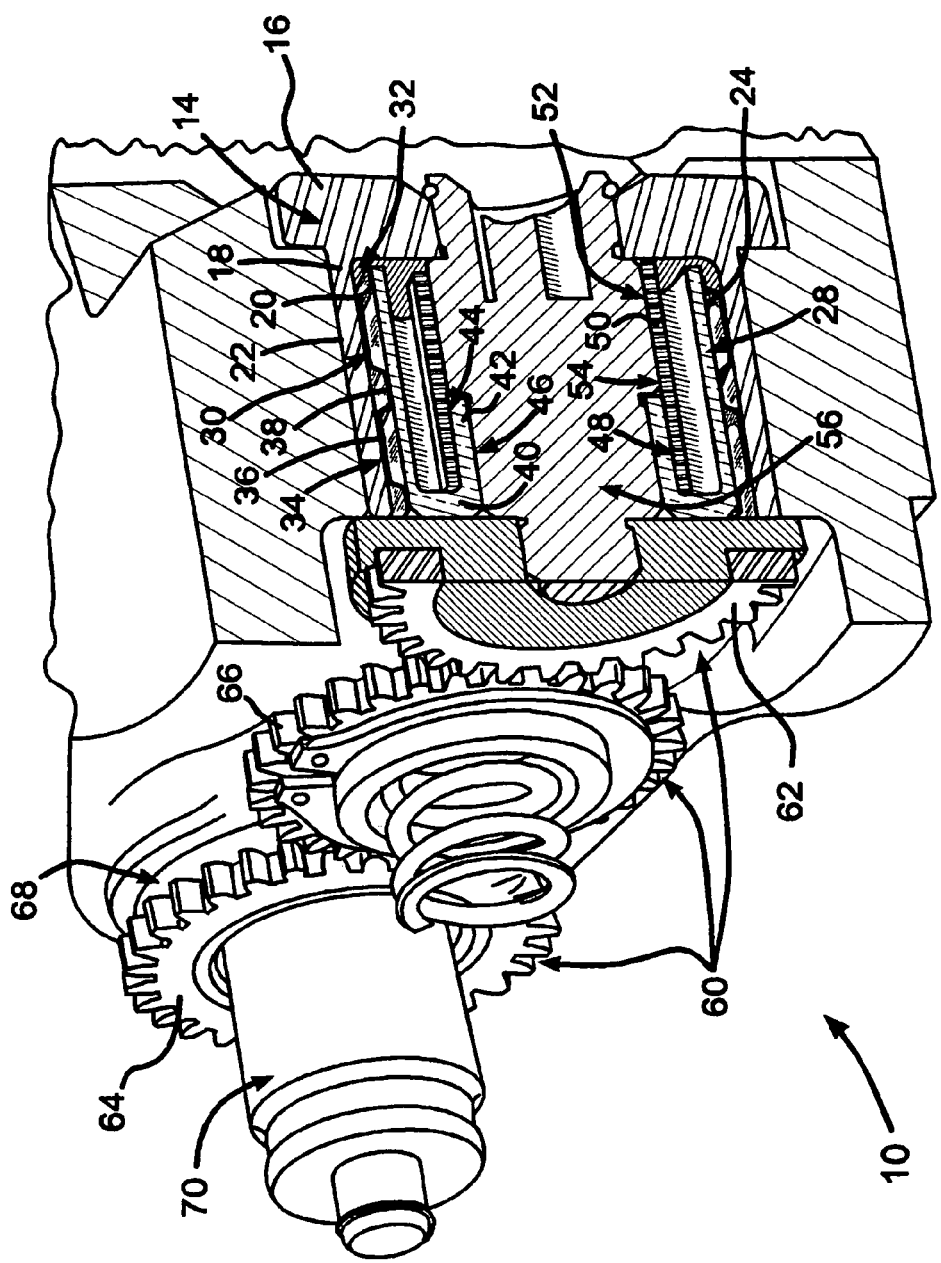
FIG. 2 is a schematic, perspective view of the embodiment depicted in FIG. 1.

In the embodiment depicted in FIGS. 1 and 2, the contour is at least one corrugation 34 having a peak 36 in contact with the inside surface 20 of the outer clutch sleeve 14 and a valley 38 in contact with the outer surface 24 of the clutch cap 26. Those skilled in the art will appreciate that additional corrugations 34 may be used without departing from the scope or the spirit of the present invention. It should also be appreciated that the peak 36 and the valley 38 can be located anywhere between the outer clutch sleeve 14 and the clutch cap 26 and that the coupling device 30 can be of any length.

At least one peak 36 of the corrugation of the coupling device 30 is designed to exert a pre-determined amount of force substantially normal to the inside surface 20 of the outer clutch sleeve 14. At least one valley 38 of the corrugation 34 of the coupling device 30 is designed to exert a pre-determined amount of force substantially normal to the outer surface 24 of the clutch cap 26. Preferably, the coupling device 30 exerts a substantially constant torque resistance on the clutch cap 26 and the outer clutch sleeve 14 sufficient to selectively couple the clutch cap 26 and the outer clutch sleeve 14 during a braking action.

At least one peak 36 and at least one valley 38 of the coupling device 30 are dimensioned to at least partially compress when installed in the gap 32 between the inside surface 20 of the outer clutch sleeve 14 and the outer surface 24 of the clutch cap 26. The coupling device 30 is linearly installed between the outer clutch sleeve 14 and the clutch cap 26.

On one end of the clutch cap 26, a second leg 40 extends radially inward substantially perpendicular to the first leg 25. A third leg 42, connected to the second leg 40, extends in a direction normal to the second leg 40 axially inward. The third leg 42 has an inside surface 44 and an outside surface 46. The first leg 28, the second leg 40 and the third leg 42 form a C-shaped structure.

Preferably, at least a first portion 48 of a one-way spring clutch 50 is connected to the inside surface 44 of the third leg 42 of the clutch cap 26. As shown in FIG. 1, it is preferred that at least a second portion 52 of the one-way spring clutch 50 is also connected to a portion 54 of a clutch drive shaft 56.

The clutch drive shaft 56 is connected to a gear train 60, as shown in FIGS. 1 and 2. The gear train 60 preferably comprises five gears, only three of which are shown in the figures as the other two have been cut-away from the figures for clarity.

As best seen in FIG. 2, a first gear 62 is connected to the clutch drive shaft 56. A second gear 64 is connected to a tappet sleeve 68. And a third gear 66 is drivingly connected between the first gear 62 and the second gear 64.

Those skilled in the art will appreciate that other structures than the gear train 60 may be used to synchronize the clutch drive shaft 56 with the tappet sleeve 68. The other structures include, but are not limited to, chains and/or cables. Of course, gear trains having greater or fewer gears than those described and depicted herein are within the scope of the invention also.

The tappet sleeve 68 is connected to a tappet 70 by any means known to those skilled in the art for axially moving the tappet 70. The means includes, but is not limited to, one or more cams and/or interlocking helical splines (not shown).

As shown in FIG. 1, the tappet 70 extends toward a center portion 72 of a rotor 74, to effect braking as known by those skilled in the art. The tappet 70 can also move away from the rotor 74 to reduce, or eliminate, braking, or to adjust the mechanism 10 to account for brake lining wear or any excessive clearance between the brake pad (not shown) and the rotor 74.

In a preferred embodiment, a fourth gear (not shown) is connected to a second tappet sleeve (not shown). A fifth gear (not shown) is drivingly connected between the fourth gear and the first gear 62. The second tappet sleeve is connected to a second tappet (not shown) in the same manner the tappet sleeve 68 is connected to the tappet 70.

A preferred method of operating the mechanism 10 comprises engaging the lever 12 to rotate the outer clutch sleeve 14 during a braking action. The outer clutch sleeve 14 is selectively coupled, through the coupling device 30, to the clutch cap 26 to rotate the clutch cap 26. The clutch cap 26 in turn rotates the one-way spring clutch 50 and the spring clutch 50 rotates the clutch drive shaft 56. The clutch drive shaft 56 rotates the gear train 60 causing rotation of the tappet sleeve 68. The rotation of the tappet sleeve 68 causes the threaded tappet 70 to screw towards the rotor 74, as known to those skilled in the art. The second tappet sleeve and tappet are similarly simultaneously controlled.

The braking force to the rotor 74 continues as the lever 12 motion continues. The increase in the brake clamp force creates a corresponding increase in the rotation drag torque of the tappet sleeve 68. The rotation drag torque is transmitted through the tappet sleeve 68, the gear train 60, the clutch drive shaft, the one way spring, and the clutch cap to the coupling device 30. If the drag torque is greater than the designed torque capacity of the coupling device 30, a rotational slip will occur between the coupling device 30 and the outer clutch sleeve 14. The slip allows the outer clutch sleeve 14 to rotate independently from the clutch drive shaft 56. The slip decouples the lever 12 motion from the tappet sleeve 68 rotation, preventing continued movement of the tappet 70 and excessive loading of the linkage between the motion of the lever 12 and the tappet sleeve 68 rotation. The reverse rotation of the outer clutch sleeve 14 is decoupled from the adjustment mechanism through the one-way spring clutch 50 to prevent forced reverse adjustment.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A torque limiting device for a brake actuator mechanism, comprising:
a clutch cap having an inner surface and an outer surface, said inner surface engaged with a clutch drive shaft, wherein said clutch cap is connected to said clutch drive shaft through a one-way spring clutch;
an outer clutch sleeve having an inner surface disposed radially outward from said outer surface of said clutch cap; and
a ring disposed between said outer surface of said clutch cap and said inner surface of said outer clutch sleeve, said ring having at least one corrugated surface for selectively coupling said clutch cap and said outer clutch sleeve.

2. The device of claim 1, wherein said ring has at least one corrugation having at least one peak in contact with said inside surface of said outer clutch sleeve and at least one valley in contact with said outer surface of said clutch cap.

3. The device of claim 2, wherein said peak exerts a pre-determined amount of force substantially normal to said inside surface of said outer clutch.

4. The device of claim 2, wherein said valley exerts a pre-determined amount of force substantially normal to said outer surface of said clutch cap.

5. The device of claim 1, wherein said outer clutch sleeve is connected to a lever.

6. The device of claim 1, wherein said outer surface of said clutch cap and said inner surface of said outer clutch sleeve are substantially concentric with one another and form a gap in which said ring is disposed.

7. The device of claim 1, wherein said clutch drive shaft is connected to a gear train.

8. The device of claim 7, wherein said gear train is connected to a tappet sleeve and said tappet sleeve houses a threaded tappet.

9. A coupling device for a brake actuator mechanism, comprising:
at least a portion of a clutch cap being coaxial with an outer clutch sleeve; and
a coupling device located between said clutch cap and said outer clutch sleeve for selectively coupling said clutch cap and said outer clutch sleeve;
wherein said coupling device has at least a first portion of at least one corrugation in contact with said clutch cap and least a second portion of said corrugation in contact with said outer clutch sleeve; and
wherein said clutch cap has an inner surface in contact with a clutch drive shaft and an outer surface in contact with said coupling device, wherein said clutch drive shaft is connected to a gear train which is drivingly connected to a tappet sleeve for rotating a tappet toward and away from a brake rotor.

10. The coupling device of claim 9, wherein said corrugation has at least one peak exerting a pre-determined amount of substantially normal force on said inside surface of said outer clutch and said corrugation has at least one valley exerting a pre-determined amount of substantially normal force on said outer surface of said clutch cap.

11. A method of coupling members in a brake actuator mechanism, comprising:
providing a clutch cap having an inner surface and an outer surface, said inner surface engaged with a clutch drive shaft;
providing an outer clutch sleeve having an inner surface disposed radially outward from said outer surface of said clutch cap; and
selectively coupling said clutch cap and said outer clutch sleeve with a coupling member located between said outer surface of said clutch cap and said inner surface of said outer clutch sleeve; and
wherein said outer clutch sleeve is rotated and said coupling member transfers the rotational force from the outer clutch sleeve to said clutch cap.

12. The method of claim 11, wherein said coupling member has at least one corrugation providing a pre-determined force normal to said inner surface of said outer clutch sleeve and a pre-determined force normal to said outer surface of said clutch cap.

13. The method of claim 12, wherein said clutch cap is rotated resulting in the rotation of a said clutch drive shaft, a gear train connected said clutch drive shaft and a tappet sleeve connected to said gear train.

14. The method of claim 13, wherein rotation of said tappet sleeve extends a tappet mounted within said tappet sleeve to extend toward a brake rotor.

15. The method of claim 14, wherein a rotational drag torque is transferred from said brake rotor through said tappet, through said tappet sleeve, through said gear train, through said clutch drive shaft, through said clutch cap and through a one-way spring clutch to said coupling member.

16. The method of claim 15, wherein said coupling member will slip adjacent said inner surface of said outer clutch sleeve when said rotational drag torque exceeds a pre-determined value.

17. The method of claim 16, wherein said outer clutch sleeve rotates independently of said clutch drive shaft when said rotational drag torque exceeds said pre-determined value.

* * * * *